(12) United States Patent
Meinel

(10) Patent No.: US 6,184,818 B1
(45) Date of Patent: Feb. 6, 2001

(54) LEVEL MEASURING ARRANGEMENT

(75) Inventor: Holger Meinel, Elchingen (DE)

(73) Assignee: DaimlerChrysler AG, Stuttgart (DE)

( * ) Notice: Under 35 U.S.C. 154(b), the term of this patent shall be extended for 0 days.

(21) Appl. No.: 09/266,761

(22) Filed: Mar. 12, 1999

(30) Foreign Application Priority Data

Mar. 12, 1998 (DE) .............................. 198 10 601

(51) Int. Cl.[7] .............................. G01F 23/00; G01S 13/08

(52) U.S. Cl. .................... 342/124; 342/118; 324/642; 324/644; 73/290 R; 73/304 R

(58) Field of Search ..................................... 342/118, 124, 342/165, 169, 170, 172, 173, 174, 175, 192, 193, 195, 196; 73/290 R, 294, 298, 304 R, 304 C, 305; 324/642, 643, 644

(56) References Cited

U.S. PATENT DOCUMENTS

| 4,566,321 | * | 1/1986 | Zacchio ............................ 73/290 R |
| 4,670,754 | * | 6/1987 | Zacchio ............................ 342/124 |
| 5,136,299 | | 8/1992 | Edvardsson ....................... 342/124 |
| 5,148,177 | * | 9/1992 | Nagamune et al. ............... 342/124 |
| 5,182,565 | * | 1/1993 | Nagamune et al. ............... 342/124 |
| 5,365,178 | * | 11/1994 | Van Der Pol ..................... 324/644 |
| 5,609,059 | * | 3/1997 | McEwan ........................... 73/290 R |

* cited by examiner

Primary Examiner—Bernarr E. Gregory
(74) Attorney, Agent, or Firm—Venable; Robert Kinberg; Catherine Voorhees

(57) ABSTRACT

An arrangement for measuring the liquid level in a tank. The arrangement has a microwave transmitting/receiving device and a waveguide that extends into the tank for guiding a coupled-in microwave. The waveguide has clear and constant wave propagation characteristics for a wave with the operating frequency.

9 Claims, 2 Drawing Sheets

LEVEL MEASURING ARRANGEMENT

CROSS-REFERENCE TO RELATED APPLICATION

This application claims the priority of application No. 198 10 601.7 filed in Germany on Mar. 12, 1998, the rights of priority of which are claimed and the subject matter of which is incorporated herein by reference.

BACKGROUND OF THE INVENTION

The present invention relates to a level measuring arrangement for measuring the liquid level in a tank by using a microwave transmitting/receiving devices and a waveguide that extends into the tank for guiding a coupled-in microwave.

In addition to mechanical measuring methods using floaters, arrangements for measuring the liquid level in tanks are known and are used primarily in large tank plants and tank plants with floating lids. These arrangements use microwave radiation to determine the distance to the liquid, and thus the liquid level, from the echoes reflected by the liquid surface. The measuring accuracy is in the millimeter range to centimeter range.

An arrangement of the above type is shown in U.S. Pat. No. 5,136,299, in which a microwave transmitter excites a wave in a first hollow conductor segment. A specific polarization direction of the electric field vector is forcibly imposed on this wave by means of a polarizing plate. The polarized wave travels from the first hollow conductor segment via a transition piece into a measuring tube having a considerably larger diameter. The measuring tube has a plurality of openings along a casing line to allow an interchange with the surrounding liquid, so that it is ensured that the filling level inside the measuring tube is equal to the surrounding filling level. The tube also functions as a settling tube (stilling well) to balance rapid fluctuations of the liquid surface.

The measuring tube functions as a hollow conductor for the coupled-in microwave. For specific types of oscillation, the large tube cross section can provide propagation conditions with particularly low losses. However, it also allows for the propagation of various modes with potentially different propagation speeds. Depending on the excited type of oscillation, the openings serving as interruptions in the tube wall can, moreover, influence the propagation conditions, so that the signal analysis in the microwave device cannot be scaled linearly to the filling level despite the calibration markings that are provided. In particular, the propagation conditions in the measuring operation and the calibration operation can differ with the known arrangement.

SUMMARY OF THE INVENTION

It is therefore the object of the invention to specify an arrangement of the aforementioned type which, while requiring little expenditure, makes it possible to obtain an exact and in particular scalable level measuring with high precision.

With the above objects in view, the present invention resides in the provision of measuring arrangement of the above type in which the wave guide has clear and constant wave propagation characteristics for a wave with the operating frequency.

As a result of the unambiguous and constant waveguide propagation characteristics, as referred to the operating frequency, the echo delay time of the microwave signal can be imaged unambiguously and linearly on the filling level. The arrangement can be set up inexpensively since commercially available radar level sensors without mode adapter can be used.

DETAILED DESCRIPTION OF THE PREFERRED EMBODIMENT

Figure 1:
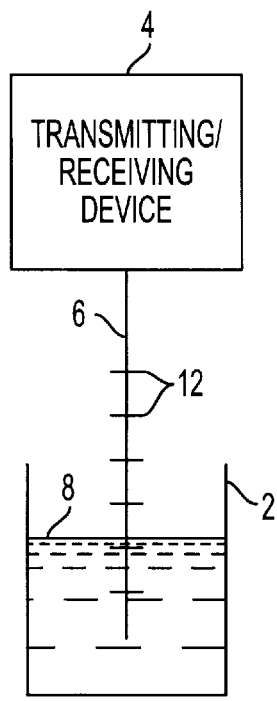
FIG. 1 is a schematic illustration of the level measuring arrangement according to the invention.

As shown in FIG. 1, an arrangement for measuring levels of a liquid in a tank 2 includes a microwave transmitting/receiving device 4 and a waveguide 6 that extends into liquid 8 contained by tank 2. Waveguide 6 guides a coupled-in microwave from transmitting/receiving device 4 into tank 2 and liquid 8.

The waveguide 6 according to the present invention can be designed as a hollow conductor, which is preferably dimensioned such that for an excited fundamental mode, especially a microwave signal with $H_{11}$ wave or mode, the operation occurs in a round hollow conductor 6' (see FIG. 2a), or for a $H_{10}$ wave or mode in a rectangular hollow conductor 6" (see FIG. 2b) in the unambiguous range.

The defined wave propagation characteristics for a hollow conductor are given for operating frequencies $f_{op}$, which exceed a critical propagation frequency $f_c$, wherein for a round hollow conductor, the critical wave length $\alpha_c$ for propagation is given with the inside diameter $d_c$ of the round hollow conductor:

$$d_c = \alpha_c = c/f_c; \quad f_c < f_{op}$$

and for a rectangular hollow conductor, the critical wavelength $\alpha_c$ for propagation is given with twice the internal width a of the hollow conductor:

$$2a = \alpha_c = c/f_c; \quad f_c < f_{op}.$$

Figure 3:
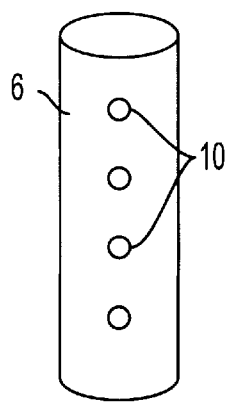
FIG. 3 represents a section of a waveguide schematically illustrating flow openings.

Similarly to the known arrangement, the arrangement according to the invention can have flow openings 10 for the liquid and/or calibration markings 12 along the path of the hollow conductor as shown in FIGS. 3 and 1. In order to retain the defined propagation characteristics, the openings arranged in particular along a casing line of the hollow conductor are positioned in a plane through the center axis of the hollow conductor, which plane is rotated far enough, relative to the polarization plane for the excited wave, so that these openings influence the propagation characteristics as little as possible.

One embodiment with calibration markings 12 along a path of the hollow conductor 6 provides that these are preferably arranged in such a way that they do not significantly interfere with the wave radiated in for the level measuring. For a calibration operation, a wave having a polarization plane that is rotated relative to the level measuring operation is radiated in, in a manner known per se, which leads to unambiguous echoes as a result of the calibration markings 12. The polarization planes between level measuring and calibration operation, in particular, are perpendicular to each other. The openings for an embodiment with calibration markings and flow openings are preferably positioned such that the propagation conditions for the level measuring operation and the calibration operation are influenced equally and as little as possible. In particular, the openings can be positioned in a plane extending through the longitudinal axis of the hollow conductor. This plane is rotated by the same angle relative to the polarization planes for the level measuring on the one hand and the calibration operation on the other hand, e.g. an angle of 45°.

If the waveguide is designed as a leakage waveguide or a dielectric waveguide, output components of the conducted wave are radiated purposely, and the echoes from these radiated components are also used for the analysis.

The waveguide can be surrounded by a larger pipe 14, so that in particular with existing plants that have a pipe or settling tube 14 with large diameter, an arrangement according to the present invention can subsequently be retrofitted with a waveguide 6 that is inserted into the settling tube 14.

Figure 2A:
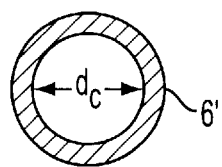
FIG. 2a and b are cross-sectional views of waveguides according to preferred embodiments.
Figure 2B:
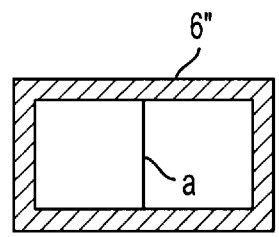
Figure 4:
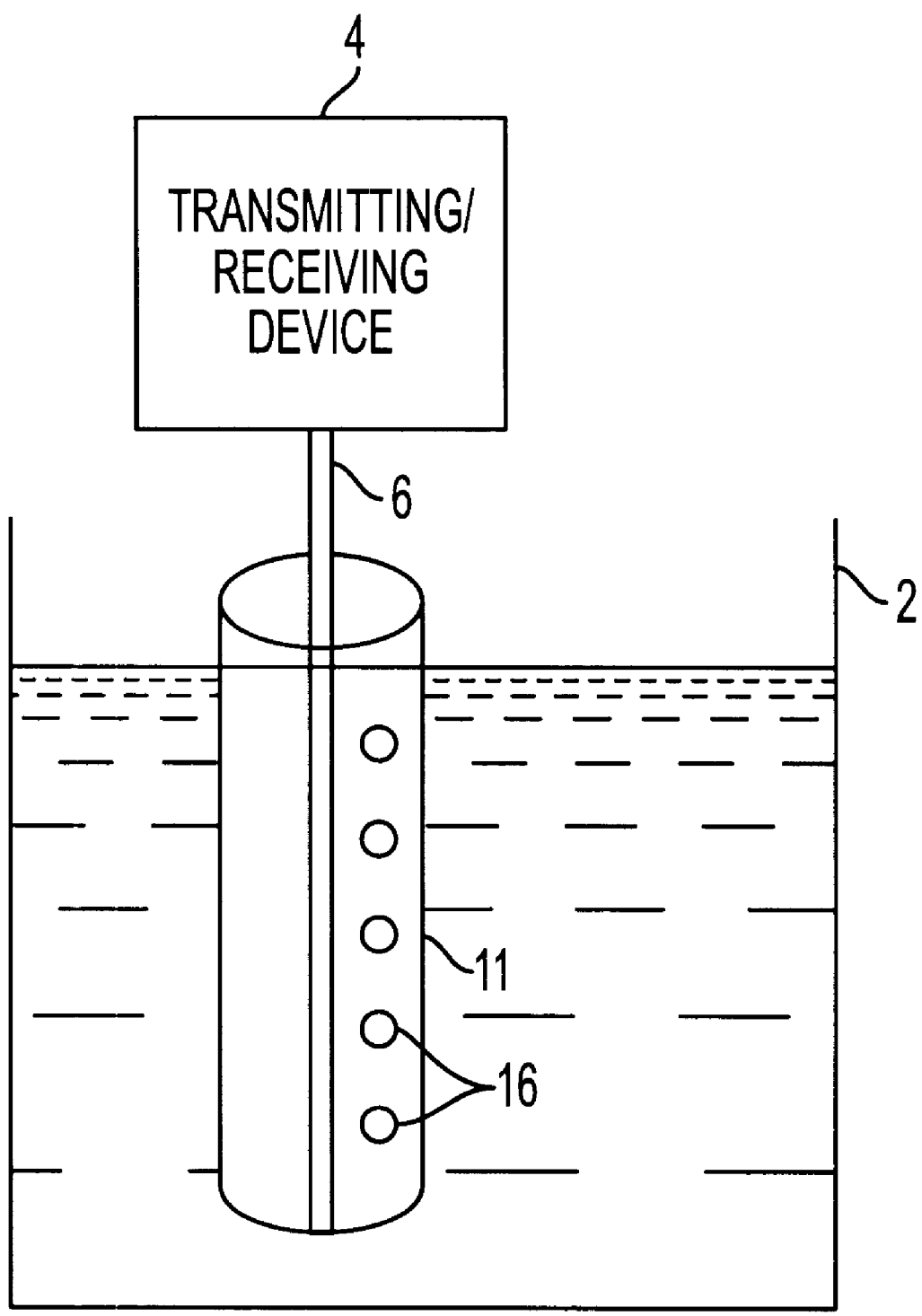
FIG. 4 is an illustration of another level measuring arrangement according to the invention.

As shown in FIG. 4, pipe or settling tube 14 has a plurality of flow openings 16 incorporated into the course of the pipe. Waveguide 6 can be a hollow conductor with a cross-section as shown in FIG. 2*a*. Pipe 14 has a diameter at least that of waveguide 6.

The invention is capable of being modified and all variations and equivalents are deemed to be encompassed by the appended claims.

What is claimed is:

1. A system for measuring levels of a liquid contained in a tank comprising:

transmitting and receiving device for emitting or receiving microwave signals;

a waveguide coupled to said transmitting and receiving device for guiding said microwave signals, wherein said waveguide extends into the liquid and has a configuration so that microwave signals propagated through said waveguide in an operating frequency remain unambiguous and constant; and at least one calibration marking positioned along a length of said waveguide, said at least one calibration marking being positioned to avoid interference with the microwave signals propagated through said waveguide for measuring the liquid levels in the tank, wherein a microwave signal having a polarization plane that is rotated relative to the level measuring operation and high sensitivity to the at least one calibration marking is excited for a calibration operation.

2. The system according to claim 1, wherein said waveguide is a leakage waveguide.

3. The system according to claim 1, wherein said waveguide is a hollow conductor.

4. The system according to claim 1, wherein said waveguide is dimensioned to operate in an unambiguous range for an excited fundamental mode.

5. The system according to claim 4, wherein said waveguide is a round hollow conductor and the excited fundamental mode is an $H_{11}$ mode.

6. The system according to claim 4, wherein said waveguide is a rectangular hollow conductor and the excited fundamental mode is an $H_{10}$ mode.

7. A system for measuring levels of a liquid contained in a tank comprising:

a transmitting and receiving device for emitting or receiving microwave signals;

a waveguide coupled to said transmitting and receiving device for guiding said microwave signals, wherein said waveguide extends into the liquid and has a configuration so that microwaves signals propagated through said waveguide in an operating frequency remain unambiguous and constant; and a pipe surrounding said waveguide, said pipe having a first plurality of flow openings disposed along a course of said pipe for allowing liquid to flow into the pipe, wherein said waveguide has a second plurality of flow openings along one or several casing lines of a wall of said waveguide, said second plurality of flow openings positioned to avoid interference with the microwave signals propagated through said waveguide.

8. The system according to claim 7, wherein said casing lines are disposed on the waveguide wall and microwave signals propagated through said waveguide for a level measuring operation and microwave signals propagated through said waveguide for a calibration operation are equally influenced by said casing lines.

9. The system according to claim 8, wherein said casing lines are disposed on the waveguide wall in a center plane between a polarization plane for an excited microwave signal for the level measuring operation and a polarization plane for an excited microwave signal for the calibration operation.

\* \* \* \* \*